No. 666,467. Patented Jan. 22, 1901.
J. O. CLARK.
TELESCOPIC CURTAIN POLE.
(Application filed Sept. 1, 1899.)
(No Model.)
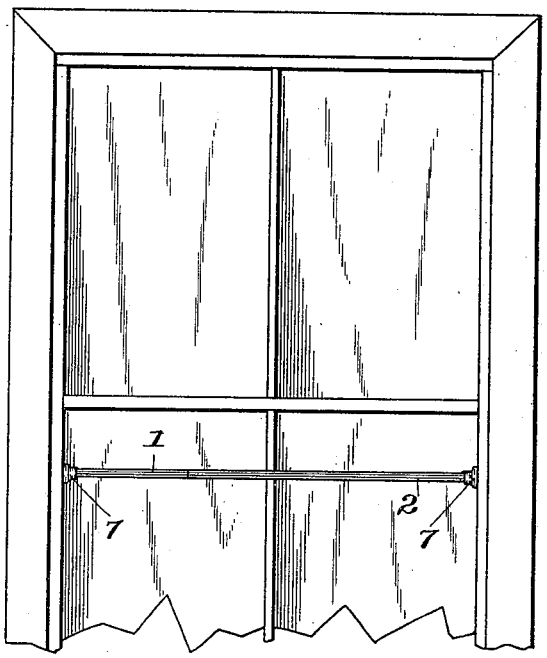
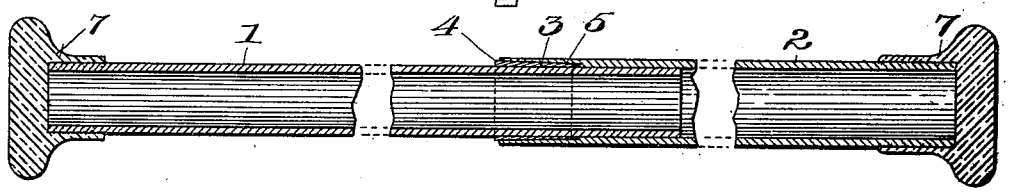
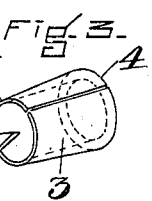
WITNESSES
A. D. Grover
E. A. Allen
INVENTOR
Joseph O. Clark
by Edward S. Beach
his Atty.

UNITED STATES PATENT OFFICE.

JOSEPH O. CLARK, OF BOSTON, MASSACHUSETTS, ASSIGNOR TO THE PHOENIX MANUFACTURING COMPANY, OF SOUTH BERWICK, MAINE.

TELESCOPIC CURTAIN-POLE.

SPECIFICATION forming part of Letters Patent No. 666,467, dated January 22, 1901.

Application filed September 1, 1899. Serial No. 729,219. (No model.)

*To all whom it may concern:*

Be it known that I, JOSEPH O. CLARK, a citizen of the United States, residing at Boston, in the county of Suffolk and State of Massachusetts, have invented certain new and useful Improvements in Telescopic Curtain-Fixtures, of which the following is a specification, reference being had therein to the accompanying drawings.

Figure 1 is a view showing one of my new telescopic supports in place between window-jambs, and in that position adapted to support a curtain, for example. Fig. 2 is a lengthwise central section of the telescopic holder. Fig. 3 is a perspective of the annular wedge which locks the telescopic member in adjusted position.

The object of my invention is to produce a telescopic holder for supporting window-curtains, portières, advertisements, articles of manufacture, garment hooks and supports, and anything else desired, the members of the holder being very nearly of the same diameter and adapted to be firmly locked in adjusted position.

In the drawings, 1 is the inner telescopic member, 2 the outer telescopic member or tube, and 3 is an annular wedge for locking or coupling the members in adjusted position. This annular wedge 3 is of an internal diameter equal throughout its length to the diameter of the inner member 1, has a sliding fit on the inner member 1, and has its outer surface tapered downwardly from its outer or butt end 4 to its inner end 5, being made of very thin metal and preferably, but not necessarily, formed on its inner end with a marginal recess 6, which secures a somewhat freer entrance of the annular edge between the opposed walls of the telescopic members when they are adjusted by crowding the annulus thereinbetween, the annulus or wedge holding the outer and inner telescopic members together by frictional contact. By my construction, wherein the telescopic members are adjusted by sliding them endwise without any turning or screwing motion and wherein the wedge is inserted between the outer and inner telescopic members by a simple endwise push and without any turning or screwing movement, a very simple and effective support is obtained for sash-curtains (and other things) and the supports are readily adjusted in place without any turning or rotative marring movement of either head upon the window-casings or other bearings between which the support is mounted.

A distinct and marked advantage of my new support lies in the fact that an effective adjustment of the wedge is always possible, because the wedge is always under the visible control of the operator and is easily inserted in the mouth of the outer telescopic member by the fingers of the operator, the marginal recesses or slits 6 permitting the thinner edge (which is made as thin as possible) of the annular wedge to enter the space between the opposed surfaces of the outer and inner telescopic members, which are made a sliding fit one for the other in order that the extended rod may not sag from the horizontal when it is in use.

It is important in practice that the telescopic members should be a sliding fit for the reason stated—that the thinner or entering end of the rectilinearly-movable wedge should hug the inner telescopic member, as it is better enabled to do by the inward spring of the marginal slots 6, and that the wedge be made of the thinnest possible material in order not to be unsightly or present such a shoulder at the joint as will interfere with the free sliding movement of slender curtain-rings, by which lace or other delicate draperies are frequently secured to the rods or upon which the hem-passage of such draperies, through which the curtain-rod is frequently passed to support the draperies, can catch and be torn when the drapery is pulled aside or slid along the rod. Were it feasible to have the curtain-rods of fairly large diameter, the annular wedges might of course be made of thick material, and perhaps the difficulty heretofore experienced of contriving thin and delicate holding devices for telescopic rods would be readily overcome; but under existing conditions, in which the curtain-rods must be of relatively small diameter and my new fastener of the thinnest practicable material, I have experienced much difficulty in devising a wedge which can be manipulated by the fingers to hold the rod-forming members together in adjusted position, for it will be observed that although inward compression on the ends of the rod tends to wedge the wedge more tightly in place in one sense, yet the very same compression tends to make the inner surface of the annular wedge slip on the inner supporting member, the opposing surfaces of the inner member and wedge-annulus becoming smooth and polished and requiring under the circumstances, in order to wedge the parts together, so that they will not slip from adjusted position, a biting action at the thin edge of the wedge on the inner telescopic member. This biting action I find to be obtained in practice by those portions of the thin edge of the wedge which are between the recesses 6, which permit the intermediate portions of the thin edge to be each sprung hard and tight against the inner telescopic member when the outer telescopic member is crowded over the thinner edge of the annular wedge. It may be said that the recesses 6 form the thin end of the wedge-annulus with a plurality of wedges by separation of those parts of the end which are between the recesses. The wedge-annulus is free from projections both within and without.

The outer ends of the members 1 and 2 are provided with elastic heads 7, one of which is adapted to be compressed when the members 1 and 2 are forced apart between opposed walls or framework, the retracting strain of the elastic head when the rod is located and released from the pressure of the hand exerting inward pressure on the telescopic members, whereby the mouth of the member 2 is held in such intimate contact with the tapering surface of the annular wedge that said wedge is compressed and clamped onto the surface of the member 1.

By placing the heads 7 between opposed walls or framework and crowding the members apart and then sliding the annular wedge between the members they are readily locked together in a very secure manner at the inner end of the outer telescopic member 2. By this construction an appearance of uniform diameter from end to end of the holder is obtained, and the holder possesses the marked advantage of having the annular wedge in sight and in a position to be manipulated by the thumb and finger when it is desired to lock the telescopic members in adjusted position.

What I claim is—

1. A telescopic fixture comprising an inner member, an annular wedge closely embracing said member and adapted to slide thereon, an outer tubular member closely embracing the inner member and having a mouth which is adapted to engage and compress the annular wedge to clamp the same on the inner member, and means carried by said fixture for exerting a constant endwise, elastic pressure on one of said members whereby the mouth of the outer member is maintained in compressible relation to the wedge.

2. A telescopic fixture comprising an inner member having a head at its outer end, a tubular wedge, having a compressible portion, closely embracing said member to slide thereon, and an outer tubular member closely embracing the inner member, having at its inner end a mouth adapted to receive and compress said wedge when forced thereon, and provided at its outer end with an elastic compressible head which is adapted to exert an inward strain on said outer member, to maintain the mouth thereof in compressible relation to the annular wedge.

In testimony whereof I affix my signature in presence of two witnesses.

JOSEPH O. CLARK.

Witnesses:
EDWARD S. BEACH,
E. A. ALLEN.